United States Patent
Ueno (10) Patent No.: US 9,709,095 B2
(45) Date of Patent: *Jul. 18, 2017

(54) RETAINER AND BALL BEARING

(71) Applicant: NTN Corporation, Osaka (JP)

(72) Inventor: Takashi Ueno, Shizuoka (JP)

(73) Assignee: NTN CORPORATION, Osaka (JP)

(*) Notice: Subject to any disclaimer, the term of this patent is extended or adjusted under 35 U.S.C. 154(b) by 0 days.

This patent is subject to a terminal disclaimer.

(21) Appl. No.: 14/386,962

(22) PCT Filed: Mar. 25, 2013

(86) PCT No.: PCT/JP2013/058544
§ 371 (c)(1),
(2) Date: Sep. 22, 2014

(87) PCT Pub. No.: WO2013/146662
PCT Pub. Date: Oct. 3, 2013

(65) Prior Publication Data
US 2015/0043855 A1 Feb. 12, 2015

(30) Foreign Application Priority Data

Mar. 26, 2012 (JP) ................. 2012-069553

(51) Int. Cl.
*F16C 33/38* (2006.01)
*F16C 33/42* (2006.01)
(Continued)

(52) U.S. Cl.
CPC ........ *F16C 33/3887* (2013.01); *F16C 33/427* (2013.01); *F16C 19/06* (2013.01);
(Continued)

(58) Field of Classification Search
CPC .......... F16C 19/02; F16C 19/04; F16C 19/06; F16C 19/16; F16C 19/163; F16C 19/166;
(Continued)

(56) References Cited

U.S. PATENT DOCUMENTS

| 4,900,164 A | 2/1990 | Nakamura |
| 4,958,946 A * | 9/1990 | Voll ............................. 384/523 |

(Continued)

FOREIGN PATENT DOCUMENTS

| CN | 102362087 | 2/2012 |
| CN | 202140424 | 2/2012 |

(Continued)

OTHER PUBLICATIONS

International Preliminary Report on Patentability (Chapter 1) and Written Opinion of the International Search Authority issued Oct. 1, 2014 in International (PCT) Application No. PCT/JP2013/058544.

(Continued)

*Primary Examiner* — James Pilkington
(74) *Attorney, Agent, or Firm* — Wenderoth, Lind & Ponack, L.L.P.

(57) ABSTRACT

A retainer includes two annular retaining plates combined with each other, and each having semispherical bulging portions arranged at predetermined intervals along a circumferential direction of the retainer. The semispherical bulging portions, which face each other, form a pocket having a ring-like shape, for retaining a ball. The pocket includes a ball non-contact portion formed in a ball facing surface of the pocket at a center portion in a pocket axial direction, the ball non-contact portion being defined by a recess extending in a pocket circumferential direction. The following relationship is set: A/(B+C)=0.70 to 0.90, where "A" represents a pocket circumferential length of the ball non-contact portion, "B" represents a diameter of the ball, and "C" represents a gap formed between the ball and the ball facing surface of the pocket.

15 Claims, 6 Drawing Sheets

(51) Int. Cl.
*F16C 19/06* (2006.01)
*F16C 33/66* (2006.01)

(52) U.S. Cl.
CPC ...... *F16C 33/3875* (2013.01); *F16C 33/6651* (2013.01); *F16C 2240/44* (2013.01); *F16C 2326/06* (2013.01)

(58) Field of Classification Search
CPC .. F16C 33/38; F16C 33/3868; F16C 33/3887; F16C 33/6651
See application file for complete search history.

(56) References Cited

U.S. PATENT DOCUMENTS

| | | | | |
|---|---|---|---|---|
| 5,806,990 | A | * | 9/1998 | Ueno et al. ................ 384/530 |
| 6,010,248 | A | | 1/2000 | Ueno et al. |
| 9,206,490 | B2 | * | 12/2015 | Ueno ................ F16C 33/3875 |
| 2008/0187263 | A1 | * | 8/2008 | Spielfeld et al. ............. 384/523 |
| 2011/0069918 | A1 | | 3/2011 | Wakuda et al. |
| 2011/0311174 | A1 | | 12/2011 | Doeppling et al. |
| 2012/0051680 | A1 | * | 3/2012 | Ishikawa et al. ............. 384/462 |

FOREIGN PATENT DOCUMENTS

| | | |
|---|---|---|
| DE | 39 39 438 | 6/1991 |
| JP | 46-34244 | 11/1971 |
| JP | 61-188025 | 11/1986 |
| JP | 2002-303326 | 10/2002 |
| JP | 2003-13962 | 1/2003 |
| JP | 2003-194066 | 7/2003 |
| JP | 2008-281073 | 11/2008 |
| JP | 2008-291970 | 12/2008 |
| JP | 2009-299813 | 12/2009 |
| JP | 2011-47474 | 3/2011 |

OTHER PUBLICATIONS

International Search Report issued Apr. 16, 2013 in International (PCT) Application No. PCT/JP2013/058544.
Extended European Search Report issued Dec. 8, 2015 in corresponding European Patent Application No. 13767531.0.
Chinese Office Action issued Jan. 20, 2016 in corresponding Chinese Patent Application No. 201380015691.6 (partial English-language translation).
Japanese Office Action issued May 24, 2016, in counterpart Japanese Patent Application No. 2012-069553, with English translation.

* cited by examiner

RETAINER AND BALL BEARING

TECHNICAL FIELD

The present invention relates to a retainer and a ball bearing.

BACKGROUND ART

As part of energy saving policies, there is an ever-increasing demand for lower fuel consumption of automobiles as well. In particular, there is an increasing demand from automobile manufacturers to reduce torque of bearings for supporting automotive transmissions and differentials for the purpose of achieving lower fuel consumption. As one measure to achieve lower fuel consumption, tapered roller bearings, which have been used thus far, are replaced by ball bearings having lower torque than the tapered roller bearings (type of bearing is changed).

Figure 8:
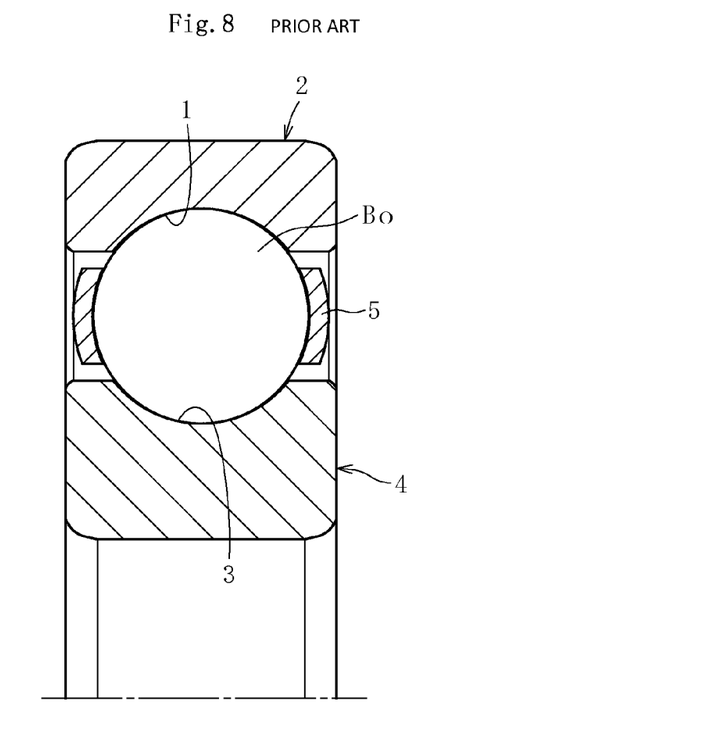
FIG. 8 is a sectional view of a related-art ball bearing.

As illustrated in FIG. 8, a general related-art ball bearing (deep-groove ball bearing) includes an outer race 2 having a circular-arc outer rolling surface 1 formed on an inner circumference thereof, an inner race 4 having a circular-arc inner rolling surface 3 formed on an outer circumference thereof so as to face the outer rolling surface 1, a retainer 5 arranged between the inner race 4 and the outer race 2, and a plurality of balls Bo rollably supported by the retainer 5.

Figure 9:
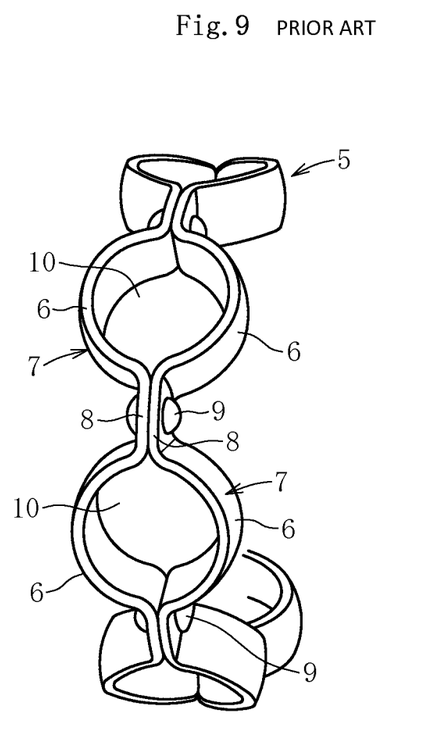
FIG. 9 is a perspective view of a related-art retainer.

As illustrated in FIG. 9, the retainer 5 includes two annular retaining plates 7 and 7 combined with each other. The two annular retaining plates 7 and 7 each have semispherical bulging portions 6 arranged at predetermined intervals along a circumferential direction of the retainer 5. Specifically, each of the annular retaining plates 7 includes the semispherical bulging portions 6 arranged along the circumferential direction and flat portions 8 between the semispherical bulging portions 6 adjacent to each other. In a combined state, the flat portions 8 and 8 are superimposed on each other, and the flat portions 8 and 8 are coupled to each other through intermediation of fasteners 9 such as rivets. Thus, the semispherical bulging portions 6 face each other to form ball-fitting portions (pockets) 10 each having a ring-like shape.

In recent years, to meet the demand for lower fuel consumption, further torque reduction has been desired for the ball bearing as well despite the fact that the torque is originally low. The torque reduction can be achieved through changes in internal design specifications (reduction in number of balls, reduction in contact area between the ball and a guide surface of the retainer, and the like), which may however lead to excessive contact pressure, shorter life, or other influence on the functions of the bearing. In addition, significant change in shape of the retainer may cause cost increase due to the need for a new mold. Thus, it is not preferred to change the internal design specifications of the bearing having standard specifications, and to significantly change the shape of the retainer.

In this case, the ratio of torque-generating factors in the torque of the deep-groove ball bearing is confirmed to be rolling torque (26%) generated due to contact between the ball and the guide surface (rolling surface of each of the inner and outer races), oil shear torque resistance (71%) generated due to contact between the ball and a guide surface of the pocket (ball contact portion of the retainer), and others (3%). Thus, to achieve torque reduction, it is effective that the oil shear torque generated due to the contact between the guide surface of the pocket and the ball be reduced because of its higher torque ratio.

The bearing used for the confirmation of the ratio of torque-generating factors was a bearing having an inner diameter of $\phi 35$ mm, an outer diameter of $\phi 72$ mm, and a width of 17 mm (bearing #6207 manufactured by NTN Corporation). Further, the material for the retainer in use was iron. As experimental conditions, the radial load was set to 500 N, the rotational speed was set to 4,000 r/min, the type of lubricating oil was set to automatic transmission fluid (ATF), and the lubrication conditions were set to spraying or splashing.

By the way, to reduce the oil shear torque generated due to the contact between the guide surface of the pocket (ball contact portion of the retainer) and the steel ball (ball), the contact area therebetween only needs to be reduced simply. In the related art, there are ball bearings constructed so as to reduce the contact area between the guide surface of the pocket (ball contact portion of the retainer) and the ball (Patent Literatures 1 and 2).

In Patent Literature 2, elongate holes are formed in the guide surface of the pocket (ball contact portion of the retainer), and auxiliary recesses are formed on an inner circumferential side of the pocket. The elongate holes and the recesses are formed as described above, and thus the contact area between the guide surface and the ball can be reduced.

CITATION LIST

Patent Literature 1: JP 46-34244 Y2
Patent Literature 2: JP 2003-13962 A

SUMMARY OF INVENTION

Technical Problem

In the ball bearings disclosed in Patent Literatures 1 and 2, the contact area between the guide surface of the pocket (ball contact portion of the retainer) and the ball can be reduced indeed. However, depending on the sizes, shapes, and the like of the elongate holes and the recesses, a torque reduction effect cannot be attained in some cases. Therefore, it is necessary to identify a retainer shape and dimensional restrictions that may maximize the torque reduction effect, and to grasp any specific operation conditions that may attain the torque reduction effect with the identified retainer shape. It is further necessary to consider the manufacture of the retainer shape.

The present invention provides a retainer capable of imparting a torque reduction effect even at low cost with its shape and dimensional restrictions identified, and also provides a ball bearing (deep-groove ball bearing) having the retainer assembled thereto.

Solution to Problem

According to one embodiment of the present invention, there is provided a retainer, comprising two annular retaining plates combined with each other, the two annular retaining plates each having semispherical bulging portions arranged at predetermined intervals along a circumferential direction of the retainer, the semispherical bulging portions of the two annular retaining plates, which face each other, forming a pocket having a ring-like shape, for retaining a ball, wherein the pocket comprises a ball non-contact portion formed in a ball facing surface of the pocket at a center portion in a pocket axial direction, the ball non-contact portion being defined by a recess extending in a pocket circumferential direction, and wherein the following relationship is set: A/(B+C)=0.70 to 0.90, where "A" represents a pocket circumferential length of the ball non-contact portion, "B" represents a diameter of the ball, and "C" represents a gap formed between the ball and the ball facing surface of the pocket. As described above, the ball non-contact portion defined by the recess is formed in the ball facing surface of the pocket, and hence a ball contact portion that serves as a guide surface and the ball non-contact portion that does not serve as the guide surface are formed in the ball facing surface. Note that, the gap refers to a gap formed between the ball and the guide surface of the pocket when the ball is brought closer to one side of the pocket.

By the way, in the case where the recess extending in the pocket circumferential direction is formed at the center portion in the pocket axial direction, when the pocket circumferential length of the recess is set larger, the slip area caused by the contact becomes smaller, which leads to reduction in shear resistance. When the "pocket circumferential length" is set excessively large, however, the contact between the ball and the pocket occurs not at the guide surface (ball contact portion) but at a boundary between the guide surface and the recess. When the contact occurs at the boundary as described above, oil film formability is significantly degraded, and hence there arises a risk of damage to the surface. That is, it is preferred that the "pocket circumferential length" be set to as large a dimension as possible within a range in which the ball can be retained by the guide surface of the pocket (ball contact portion) even when the ball is moved inside the pocket.

For this reason, according to one embodiment of the present invention, such a relationship is set that A/(B+C)=0.70 to 0.90, where "A" represents a pocket circumferential length of the ball non-contact portion, "B" represents a diameter of the ball, and "C" represents a gap formed between the ball and the ball facing surface of the pocket. Thus, the maximum torque reduction effect can be exerted while satisfying the functions of the bearing.

When a "pocket axial length" is set larger, the slip area caused by the contact becomes smaller, which leads to the reduction in shear resistance. By the way, the retainer may be made of metal and formed by press working. In the case where the retainer is formed by press working as described above, when the "pocket axial length" is set excessively large, the manufacture of the retainer becomes difficult, and hence there arises a risk in terms of manufacture. That is, the "pocket axial length" needs to be set to as large a dimension as possible within a range in which the pocket is not deformed even when the retainer is formed by press working.

For this reason, it is preferred to set such a relationship that D/E=0.25 to 0.40, where "D" represents a pocket axial length of the ball non-contact portion, and "E" represents an entire length of the pocket in an axial direction.

When a gap larger than a surface roughness level is set as the depth of the recess, the shear resistance can be set to "0". Considering the accuracy of press working to manufacture the retainer, however, when the depth of the recess is excessively small, the dimension cannot be secured. When the depth of the recess is excessively large, conversely, there arises a risk in that the pocket may be deformed during the press working.

For this reason, it is preferred to set such a relationship that F/G=0.30 to 0.40, where "F" represents a depth of the recess, which defines the ball non-contact portion, and "G" represents a thickness of each of the semispherical bulging portions of the two annular retaining plates.

When the center position of the recess in the pocket axial direction is offset in the pocket axial direction with respect to a center of the ball, the balance is lost so that the pocket may be deformed during the press working. For this reason, it is preferred to set such a relationship that H/(E/2)=0 to 0.2, where "E" represents an entire length of the pocket in the axial direction, and "H" represents an offset amount of a center of the ball non-contact portion in the axial direction with respect to a center of the ball.

Further, when the ball is brought into contact with the boundary between the recess and the guide surface of the pocket (ball contact portion), the oil film formability is significantly degraded. For this reason, as described above, it is preferred that the recess have such a dimensional relationship that the ball is not brought into contact with the boundary. Note that, it is preferred that the shape of the boundary be set to a rounded shape instead of an edged shape so as to prevent immediate damage in the event of contact that may occur despite the design setting for avoiding the contact.

The ball non-contact portion may be formed in every pocket. Further, the retainer may be made of metal and formed by press working, or may be made of resin and formed by injection molding.

According to one embodiment of the present invention, there is provided a ball bearing, comprising: an outer race having an outer rolling surface formed on an inner circumference thereof; an inner race having an inner rolling surface formed on an outer circumference thereof; a plurality of balls each configured to roll between the inner rolling surface and the outer rolling surface; and the above-mentioned retainer arranged between the inner race and the outer race.

The ball bearing may be applied so as to support a power transmission shaft of an automobile, or may be applied so as to support a shaft to be used for a two-wheeled vehicle.

Advantageous Effects of Invention

According to the retainer of one embodiment of the present invention, in the bearing (ball bearing) using this retainer, the maximum torque reduction effect can be exerted while satisfying the functions of the bearing. In particular, the torque reduction effect can be attained in a case of using the bearing under a state in which the amount of lubricating oil is small due to lubrication by, for example, spraying or splashing. Thus, lower fuel consumption can be achieved.

Through the setting of such relationships that D/E=0.25 to 0.40 and F/G=0.30 to 0.40, the manufacturability is excellent and the torque reduction effect can be exerted effectively. When the opening edge of the recess in the pocket axial direction is formed into the rounded shape, damage is less liable to occur even in the event of contact of the ball with the opening edge. Through the setting of such a relationship that H/(E/2)=0 to 0.2, it is possible to provide a well-balanced and high-quality bearing capable of effectively preventing, for example, the deformation of the pocket during the press working.

When the ball non-contact portion is formed in every pocket, the bearing using the retainer having this structure can achieve the torque reduction as a whole. The retainer is relatively simple in overall shape, and may be formed by press working or the like, thereby being capable of achieving cost reduction.

The torque of the bearing (ball bearing) using the retainer can be reduced. When the bearing using the retainer is used for automobiles, environmentally friendly driving can be achieved due to higher fuel efficiency. That is, this bearing is an optimum bearing for supporting a power transmission shaft of automobiles and a shaft to be used for two-wheeled vehicles.

DESCRIPTION OF EMBODIMENT

Now, an embodiment of the present invention is described with reference to the drawings.

Figure 1:
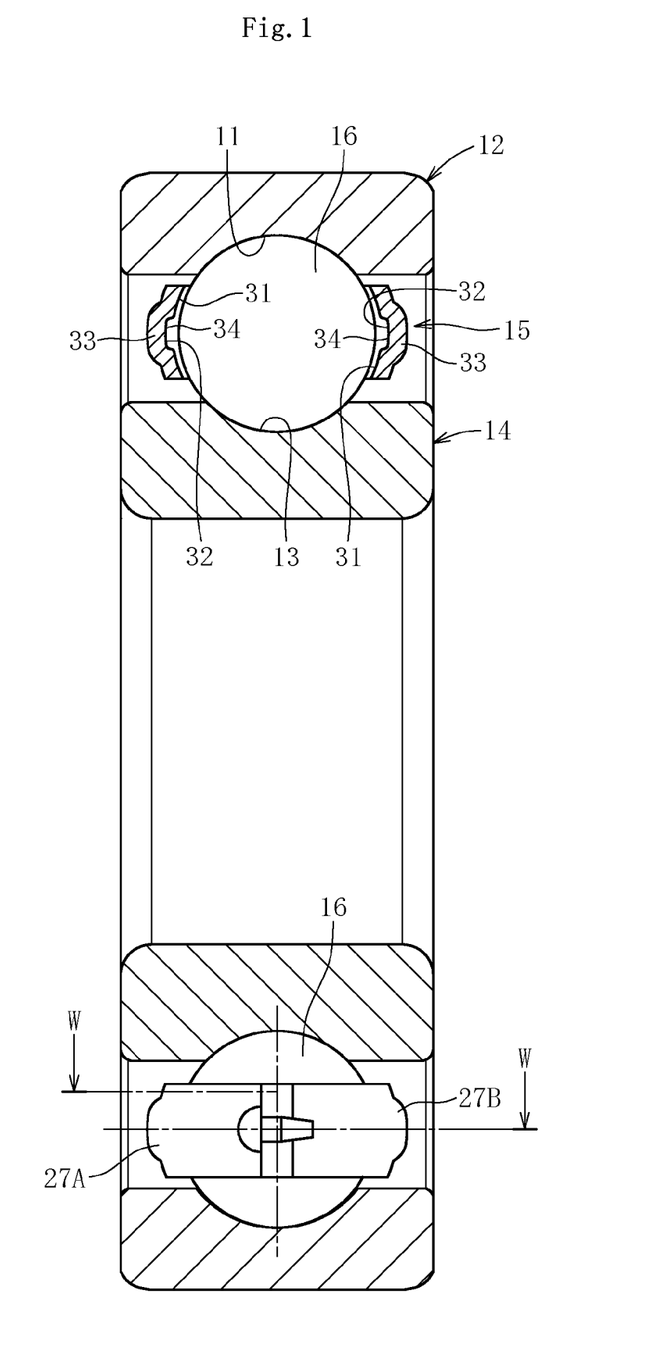
FIG. 1 is a sectional view of a bearing according to an embodiment of the present invention.

FIG. 1 illustrates a bearing (deep-groove ball bearing) using a retainer (ball bearing retainer) according to the embodiment of the present invention. The ball bearing comprises an outer race 12 having a circular-arc outer rolling surface 11 formed on an inner circumference thereof, an inner race 14 having a circular-arc inner rolling surface 13 formed on an outer circumference thereof so as to face the outer rolling surface 11, a plurality of balls 16 received between the outer rolling surface 11 and the inner rolling surface 13, and a retainer 15 of the present invention, for rollably supporting the balls 16.

The outer race 12, the inner race 14, and the balls 16 are made of, for example, high-carbon chrome bearing steel such as SUJ2, and the retainer 15 is, for example, a press-worked product of a steel strap of cold-rolled steel (for example, one of SPCC type conforming to the JIS standards).

Figure 2:
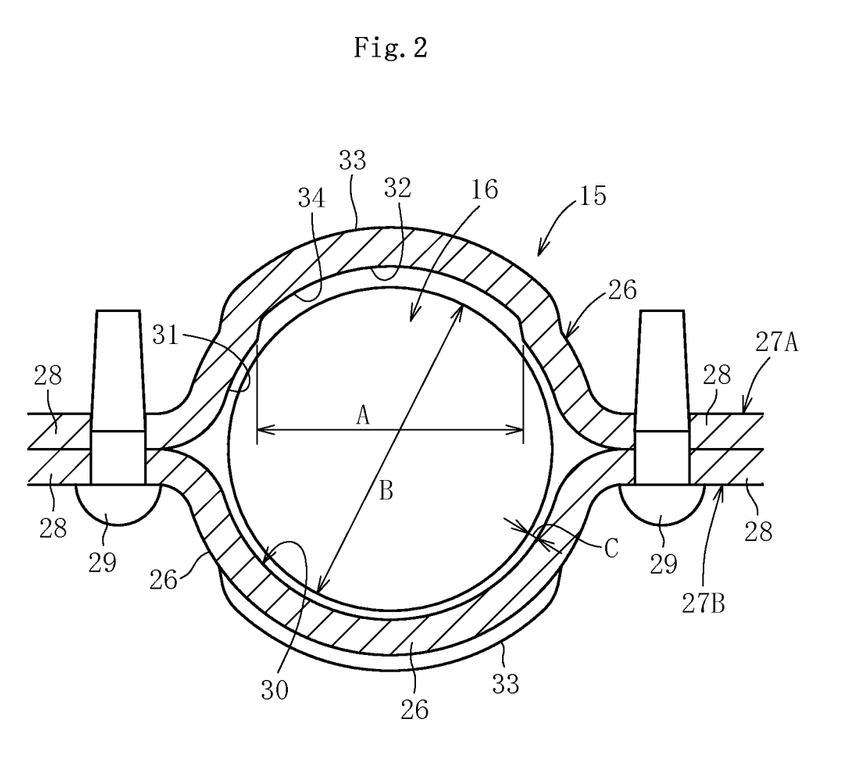
FIG. 2 is an enlarged sectional view taken along the line W-W of FIG. 1.

As illustrated in FIG. 2, which is a sectional view of the retainer 15 taken along the line W-W of FIG. 1, the retainer 15 comprises two annular retaining plates 27A and 27B combined with each other. The two annular retaining plates 27A and 27B each have semispherical bulging portions 26 arranged at predetermined intervals along a circumferential direction of the retainer 15. Specifically, each of the annular retaining plates 27A and 27B comprises the semispherical bulging portions 26 arranged along the circumferential direction and flat portions 28 between the semispherical bulging portions 26 adjacent to each other. In a combined state, the flat portions 28 and 28 are superimposed on each other, and the flat portions 28 and 28 are coupled to each other through intermediation of fasteners 29 such as rivets. Thus, the semispherical bulging portions 26 face each other to form ball-fitting portions (pockets) 30 each having a ring-like shape.

Oil lubrication is taken as a lubrication method suitable for this bearing. Note that, mineral oil such as spindle oil, machine oil, and turbine oil may be used as lubricating oil. Under a use condition that the temperature is as high as 150° C. or more or as low as −30° C. or less, synthetic oil such as diester oil, silicon oil, and fluorocarbon oil may be used.

Figure 3:
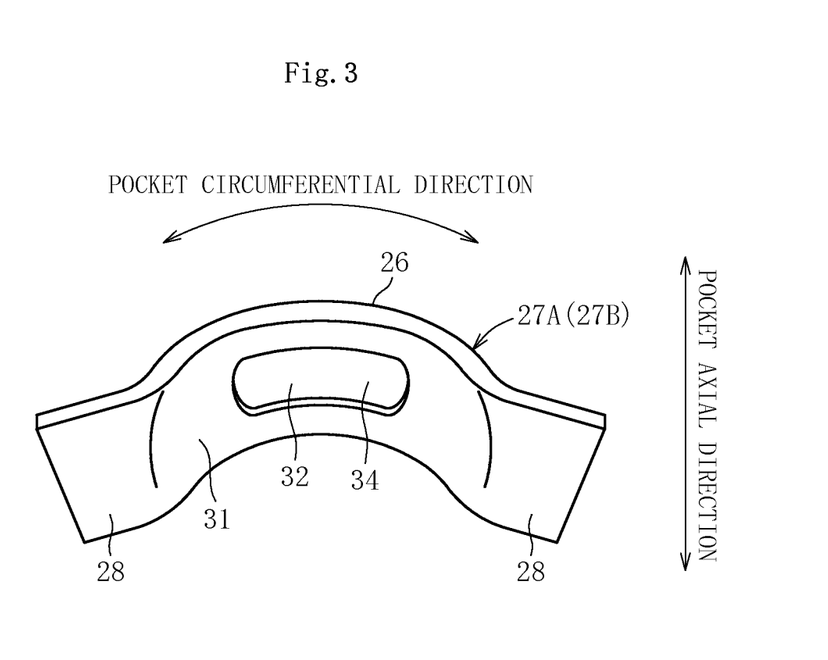
FIG. 3 is a perspective view of a pocket of a retainer as seen from an inner side thereof.
Figure 4:
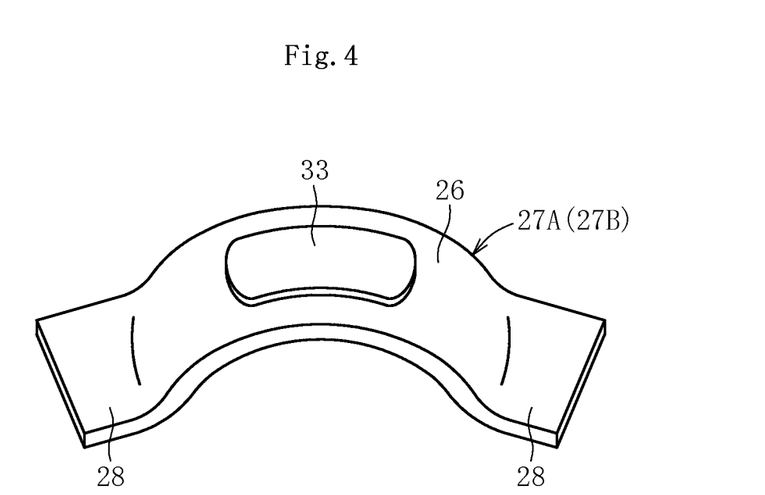
FIG. 4 is a perspective view of the pocket of the retainer as seen from an outer side thereof.

In this retainer 15, as illustrated in FIG. 3 and the like, a ball contact portion 31 and a ball non-contact portion 32 are formed in a ball facing surface of the pocket 30. Specifically, a rectangular projection 33 (see FIG. 4), which projects opposite to the ball, is formed on a surface opposite to the ball facing surface, and thus a rectangular recess 34, which is recessed opposite to the ball with respect to the ball contact portion 31, is formed in the ball facing surface of the pocket 30 at a center portion in a pocket axial direction so as to extend in a pocket circumferential direction. This recess 34 defines the ball non-contact portion 32.

As illustrated in FIG. 2, such a relationship is set that A/(B+C)=0.70 to 0.90, where "A" represents a pocket circumferential length (length in the pocket circumferential direction illustrated in FIG. 3) of the ball non-contact portion 32 defined by the recess 34, "B" represents a diameter of the ball 16, and "C" represents a gap formed between the ball 16 and the ball facing surface of the pocket 30.

Figure 5:
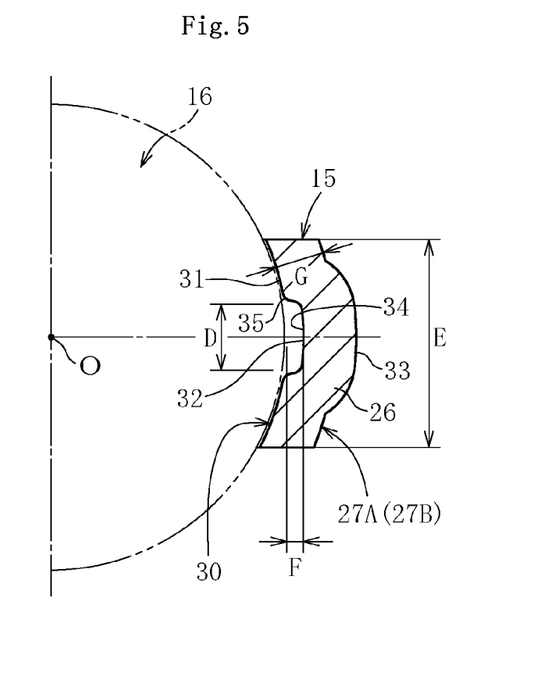
FIG. 5 is an enlarged sectional view of a main part of the retainer.

Further, as illustrated in FIG. 5, such a relationship is set that D/E=0.25 to 0.40, where "D" represents a pocket axial length (length in the pocket axial direction illustrated in FIG. 3) of the ball non-contact portion 32, and "E" represents an entire length of the pocket 30 in an axial direction. Further, such a relationship is set that F/G=0.30 to 0.40, where "F" represents a depth of the recess 34, which defines the ball non-contact portion 32, and "G" represents a thickness of each of the semispherical bulging portions 26 of the annular retaining plate 27A (27B).

Figure 6:
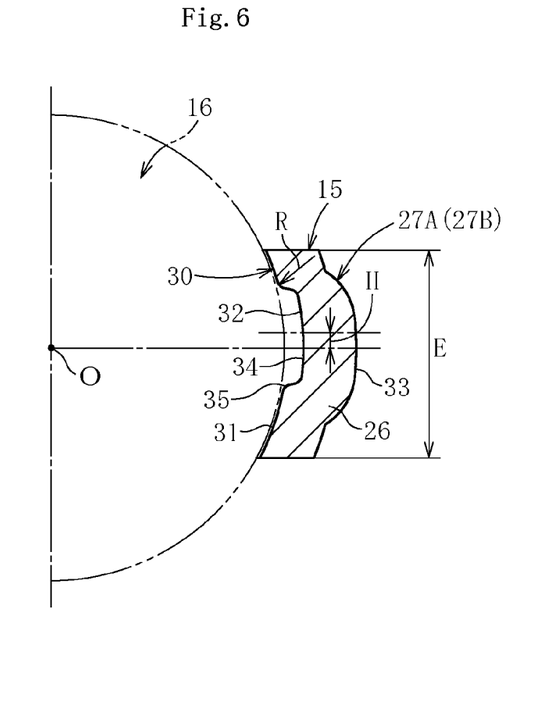
FIG. 6 is an enlarged sectional view of the main part of the retainer.

Such a relationship is set that H/(E/2)=0 to 0.2, where "E" represents an entire length of the pocket 30 in the axial direction, and "H" represents an offset amount of a center of the ball non-contact portion 32 in the axial direction with respect to a center O of the ball as illustrated in FIG. 6. Further, an opening edge 35 of the recess 34 in the pocket axial direction, which defines the ball non-contact portion 32, is formed into a rounded shape. In this case, the curvature (R) of the opening edge 35 in the pocket axial direction is set to 0.05 to 0.30 mm.

With this structure, the recess 34 may be referred to as a torque reduction groove for attaining a torque reduction effect. The torque reduction groove may be defined by such three elements as a groove width (pocket axial length: D), a groove depth (depth of the recess 34: F), and a groove length (pocket circumferential length: A).

Figure 7:
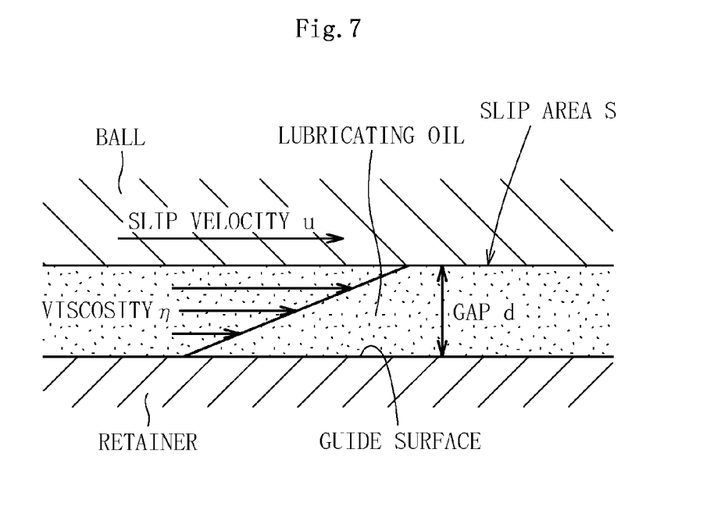
FIG. 7 is an enlarged sectional view of a main part of the pocket of the retainer.

By the way, shear resistance acting between the ball 16 and a guide surface of the pocket is defined by such four elements as a lubricating oil viscosity, a slip velocity, a slip area, and a gap illustrated in FIG. 7. In this case, the shear resistance is expressed by the following mathematical expression of Math 1 in accordance with the Newton's law of viscosity.

$$F = \eta u S / d \qquad \text{[Math 1]}$$

F: shear resistance
$\eta$: lubricating oil viscosity
u: slip velocity
S: slip area
d: gap The parameters "$\eta$" and "u" are determined by operation conditions of the bearing. Therefore, the values of those parameters cannot be changed. In addition, it can be said that, when the value of the slip area "S" is set smaller, the shear resistance becomes smaller. Therefore, when the "torque reduction groove" according to the present invention is formed, the slip area between the ball 16 becomes smaller.

Accordingly, it can be said that the shear resistance becomes smaller. Further, it is understood that, when the value of the gap "d" is set larger, the shear resistance becomes smaller. The general order of "d" that may cause the shear resistance is confirmed to be an order approximately corresponding to surface roughness, and hence, when the groove depth (gap "d") is set as a macroscopic dimension, the gap is sufficiently large so that the shear resistance can be set to "0".

Therefore, it is preferred that the above-mentioned dimensions of the groove portion be determined so that the shear resistance at the "torque reduction groove" becomes "0".

In this embodiment, in the case where the recess 34 extending in the pocket circumferential direction is formed at the center portion in the pocket axial direction, when the pocket circumferential length of the recess 34 is set larger, the slip area caused by the contact becomes smaller, which leads to reduction in shear resistance. When the "pocket circumferential length" is set excessively large, however, the contact between the ball 16 and the pocket 30 occurs not at the guide surface (ball contact portion 31) but at a boundary between the guide surface (ball contact portion 31) and the recess 34. When the contact occurs at the boundary as described above, oil film formability is significantly degraded, and hence there arises a risk of damage to the surface. Therefore, the "pocket circumferential length" was set to as large a dimension as possible within a range in which the ball 16 was able to be retained by the guide surface of the pocket even when the ball 16 was moved inside the pocket 30. For this reason, such a relationship was set that A/(B+C)=0.70 to 0.90. Thus, the maximum torque reduction effect can be exerted while satisfying the functions of the bearing.

When the "pocket axial length" is set larger, the slip area caused by the contact becomes smaller, which leads to the reduction in shear resistance. The retainer may be formed by press working. In the case where the retainer is formed by press working as described above, when the "pocket axial length" is set excessively large, the manufacture of the retainer becomes difficult, and hence there arises a risk in terms of manufacture. Therefore, the "pocket axial length" needs to be set to as large a dimension as possible within a range in which the pocket is not deformed even when the retainer is formed by press working. For this reason, such a relationship was set that D/E=0.25 to 0.40.

When a gap larger than the surface roughness level is set as the depth of the recess 34, the shear resistance can be set to "0". Considering the accuracy of press working to manufacture the retainer 15, however, when the depth of the recess 34 is excessively small, the dimension cannot be secured. When the depth of the recess 34 is excessively large, on the other hand, there arises a risk in that the pocket may be deformed during the press working.

For this reason, such a relationship was set that F/G=0.30 to 0.40, where "F" represented the depth of the recess 34, which defined the ball non-contact portion 32, and "G" represented the thickness of each of the semispherical bulging portions 26 and 26 of the annular retaining plate 27A (27B).

When the center position of the recess 34 in the pocket axial direction is offset in the pocket axial direction with respect to the center O of the ball 16, the balance is lost so that the pocket may be deformed during the press working. For this reason, such a relationship was set that H/(E/2)=0 to 0.2, where "E" represented the entire length of the pocket 30 in the axial direction, and "H" represented the offset amount of the center of the ball non-contact portion 32 in the axial direction with respect to the center O of the ball.

Further, when the ball 16 is brought into contact with the boundary between the recess 34 and the guide surface of the pocket (ball contact portion 31), the oil film formability is significantly degraded. For this reason, it is preferred that the recess 34 have such a dimensional relationship that the ball 16 is not brought into contact with the boundary. Note that, the shape of the boundary was set to a rounded shape instead of an edged shape so as to prevent immediate damage in the event of contact that might occur despite the design setting for avoiding the contact.

By the way, the above-mentioned ball non-contact portion 32 may be formed in every pocket 30 of the retainer 15, or may be formed in an arbitrary pocket 30 alone. When the ball non-contact portion 32 is formed in every pocket 30, the bearing using the retainer 15 having this structure can achieve torque reduction as a whole.

As described above, in the bearing (ball bearing) using the above-mentioned retainer, the maximum torque reduction effect can be exerted while satisfying the functions of the bearing. In particular, the torque reduction effect can be attained in a case of using the bearing under a state in which the amount of lubricating oil is small due to lubrication by, for example, spraying or splashing. Thus, lower fuel consumption can be achieved.

Through the setting of such relationships that D/E=0.25 to 0.40 and F/G=0.30 to 0.40, the manufacturability is excellent and the torque reduction effect can be exerted effectively. When the opening edge of the recess in the pocket axial direction is formed into the rounded shape, damage is less liable to occur even in the event of contact of the ball with the opening edge. Through the setting of such a relationship that H/(E/2)=0 to 0.2, it is possible to provide a well-balanced and high-quality bearing capable of effectively preventing, for example, the deformation of the pocket during the press working.

When the ball non-contact portion 32 is formed in every pocket 30, the bearing using the retainer 15 having this structure can achieve the torque reduction as a whole. The retainer 15 is relatively simple in overall shape, and may be formed by press working or the like, thereby being capable of achieving cost reduction. That is, the retainer 15 can be formed by changing only part of the process of the press working that has been employed in the related art for forming this type of retainer, thereby being capable of achieving the cost reduction. Further, the shape of a rounded corner portion (corner portion between the semispherical bulging portion and the flat portion of the annular retaining plate), which has been a weakest portion of the retainer in the related art, is not changed from a shape of the related art, and thus the strength of the retainer is not lowered.

As described above, the ball bearing (deep-groove ball bearing) capable of attaining the torque reduction effect without changing the bearing size and the internal design specifications can be provided at low cost without lowering the strength. Therefore, when the bearing using the retainer 15 is used for automobiles, environmentally friendly driving can be achieved due to higher fuel efficiency. That is, this bearing is an optimum bearing for supporting a power transmission shaft of automobiles and a shaft to be used for two-wheeled vehicles.

By the way, the retainer 15 is a metal retainer formed by press working in the above-mentioned embodiment.

The embodiment of the present invention is described above. However, the present invention is not limited to the above-mentioned embodiment, and various modifications may be made thereto. The retainer 15 is not limited to a metal retainer, and may be a synthetic resin product. As a resin material to be used for the resin retainer, for example, there may be used a polyphenylene sulfide resin (hereinafter referred to as "PPS resin"), polyamide 46 (PA46), and polyamide 66 (PA66), which have been used for retainers of this type in the related art.

The resin retainer may be formed by, for example, injection molding. Note that, even the resin retainer may be formed by grinding. Even such a resin retainer attains the same actions and effects as those of the metal retainer as illustrated in FIG. 1. Further, the number of pockets to be formed in the retainer 15 may be set arbitrarily, and the balls 16 may be made of ceramics (silicon nitride $Si_3N_4$ or alumina $Al_2O_3$).

Therefore, the method of forming the retainer may be press working or casting in the case of forming a metal retainer, and may be injection molding in the case of forming a resin retainer. That is, the retainer of the present invention may be formed by various forming methods that have generally been employed in the related art, thereby being capable of achieving the cost reduction.

Examples

Torque measurement was carried out for a bearing (deep-groove ball bearing) using a retainer having the ball non-contact portion 32 in the pocket 30, and for a bearing (deep-groove ball bearing) (related-art product) using a related-art retainer (retainer illustrated in FIG. 9) having no ball non-contact portion in the pocket 30. As each of the bearings, a bearing having an inner diameter of ϕ35 mm, an outer diameter of ϕ72 mm, and a width of 17 mm (bearing #6207 manufactured by NTN Corporation) was used. The radial load was set to 500 N, the rotational speed was set to 1,000 r/min and 2,000 r/min, the type of lubricating oil was set to automatic transmission fluid (ATF), the temperature of the lubricating oil was set to 30° C., the kinematic viscosity was set to 29.6 $mm^2/s$ (40° C.) and 7.07 $mm^2/s$ (100° C.), and the density was set to 0.87 $g/cm^3$. The oil level was set to a height corresponding to the center of a lowermost ball. Further, the retainer dimensions of the product of the present invention were set to such relationships that A/(B+C)=0.77, D/E=0.33, F/G=0.33, and R=0.2 mm.

The above-mentioned torque measurement conditions were defined as first conditions. Table 1 shows results of the torque measurement under those torque measurement conditions (torque reduction rate of the bearing using the retainer having the ball non-contact portion with respect to that of the related-art product). Further, second conditions were defined as such conditions that the oil level was set to a height for allowing immersion of the lowermost ball and the other conditions were set to the same conditions as the first conditions. Table 2 shows results of the torque measurement under those torque measurement conditions (torque reduction rate of the bearing using the retainer having the ball non-contact portion with respect to that of the related-art product).

TABLE 1

| 1,000 r/min | 2,000 r/min |
| --- | --- |
| 9% | 9% |

TABLE 2

| 1,000 r/min | 2,000 r/min |
| --- | --- |
| 0% | 0% |

Under the second conditions, agitation resistance with the lubricating oil accounts for a large share of the bearing torque, with the result that the torque reduction effect is not exerted by the retainer having the ball non-contact portion. That is, under a state in which the amount of lubricating oil is large, the torque reduction effect cannot be exerted by the ball non-contact portion. In the retainer shape of the present invention, however, the torque reduction effect is exerted in a case of using the bearing under a state in which the amount of lubricating oil is small due to lubrication by, for example, "spraying or splashing" of the lubricating oil as in the first conditions. Therefore, considering the actual use, the lubrication environment of the bearing for supporting a power transmission shaft of automobiles, such as a differential and a transmission, has a tendency toward reduction in amount of lubricating oil for the purpose of achieving lower fuel consumption. Thus, the retainer of the present invention is suitable for the bearing for supporting those shafts. Besides, in a crank, a cam, and a transmission of two-wheeled vehicles, the amount of lubricating oil is small as in the first conditions. Thus, the retainer of the present invention is suitable for application to support of the respective shafts.

In other words, the above-identified embodiment allows for an optimum ball bearing for supporting a power transmission shaft of automobiles and a shaft of two-wheeled vehicles. The recessed groove is formed in the inner circumferential surface of the pocket of the retainer, to thereby attain the torque reduction effect. Further, the retainer may be made of metal or resin, and may be formed by any forming methods that have generally been employed in the related art.

The invention claimed is:

1. A retainer, comprising two annular retaining plates combined with each other, the two annular retaining plates each having semispherical bulging portions arranged at predetermined intervals along a circumferential direction of the retainer, the semispherical bulging portions of the two annular retaining plates, which face each other, forming a pocket having a ring-like shape, for retaining a ball, wherein the pocket comprises a ball non-contact portion formed in a ball facing surface of the pocket at a center portion in a pocket axial direction, the ball non-contact portion being defined by a recess extending in a pocket circumferential direction, wherein an opening edge of the recess in the pocket axial direction, which defines the ball non-contact portion, has a rounded shape, wherein a curvature of the rounded shape is set to 0.05 to 0.30 mm, wherein the following relationship is set:

A/(B+C)=0.70 to 0.90 where "A" represents a pocket circumferential length of the ball non-contact portion, "B" represents a diameter of the ball, and "C" represents a gap formed between the ball and the ball facing surface of the pocket, wherein the following relationship is set:

D/E=0.25 to 0.40 where "D" represents a pocket axial length of the ball non-contact portion, and "E" represents an entire length of the pocket in an axial direction, and wherein the following relationship is set:

$$F/G = 0.30 \text{ to } 0.40$$

where "F" represents a depth of the recess, which defines the ball non-contact portion, and "G" represents a thickness of each of the semispherical bulging portions of the two annular retaining plates.

2. The retainer according to claim 1, wherein the retainer is made of metal and formed by press working.

3. The retainer according to claim 1, wherein the following relationship is set:

$$H/(E/2) = 0 \text{ to } 0.2$$

where "E" represents an entire length of the pocket in an axial direction, and "H" represents an offset amount of a center of the ball non-contact portion in the axial direction with respect to a center of the ball.

4. The retainer according to claim 3, wherein the ball non-contact portion is formed in every pocket.

5. The retainer according to claim 4, wherein the retainer is made of metal and formed by press working.

6. The retainer according to claim 3, wherein the retainer is made of metal and formed by press working.

7. The retainer according to claim 1, wherein the ball non-contact portion is formed in every pocket.

8. The retainer according to claim 7, wherein the retainer is made of metal and formed by press working.

9. A ball bearing, comprising:
an outer race having an outer rolling surface formed on an inner circumference thereof;
an inner race having an inner rolling surface formed on an outer circumference thereof;
a plurality of balls each configured to roll between the inner rolling surface and the outer rolling surface; and
a retainer according to claim 1, which is arranged between the inner race and the outer race.

10. The retainer according to claim 9, wherein the retainer is made of metal and formed by press working.

11. A ball bearing, comprising:
an outer race having an outer rolling surface formed on an inner circumference thereof;
an inner race having an inner rolling surface formed on an outer circumference thereof;
a plurality of balls each configured to roll between the inner rolling surface and the outer rolling surface; and
a retainer according to claim 3, which is arranged between the inner race and the outer race.

12. The retainer according to claim 11, wherein the retainer is made of metal and formed by press working.

13. A ball bearing, comprising:
an outer race having an outer rolling surface formed on an inner circumference thereof;
an inner race having an inner rolling surface formed on an outer circumference thereof;
a plurality of balls each configured to roll between the inner rolling surface and the outer rolling surface; and
a retainer according to claim 4, which is arranged between the inner race and the outer race.

14. The retainer according to claim 13, wherein the retainer is made of metal and formed by press working.

15. A ball bearing, comprising:
an outer race having an outer rolling surface formed on an inner circumference thereof;
an inner race having an inner rolling surface formed on an outer circumference thereof;
a plurality of balls each configured to roll between the inner rolling surface and the outer rolling surface; and
a retainer according to claim 7, which is arranged between the inner race and the outer race.

* * * * *